(No Model.)
J. F. McELROY.
TEMPERATURE REGULATOR.
No. 443,294. Patented Dec. 23, 1890.
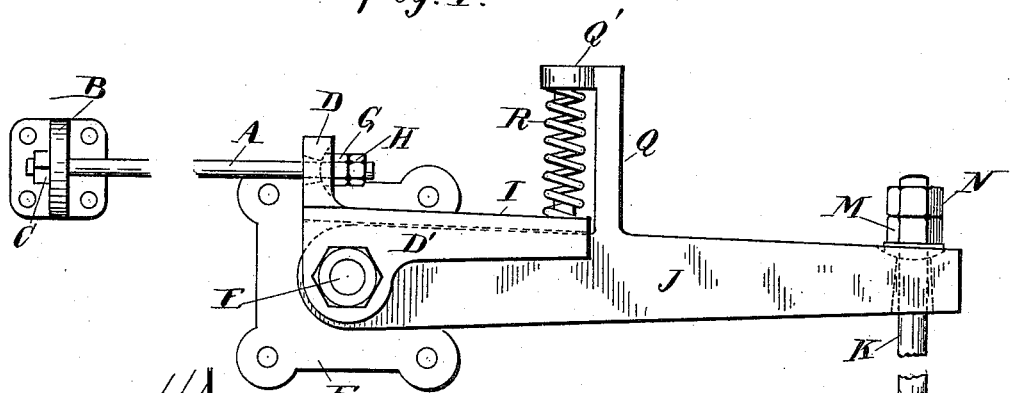
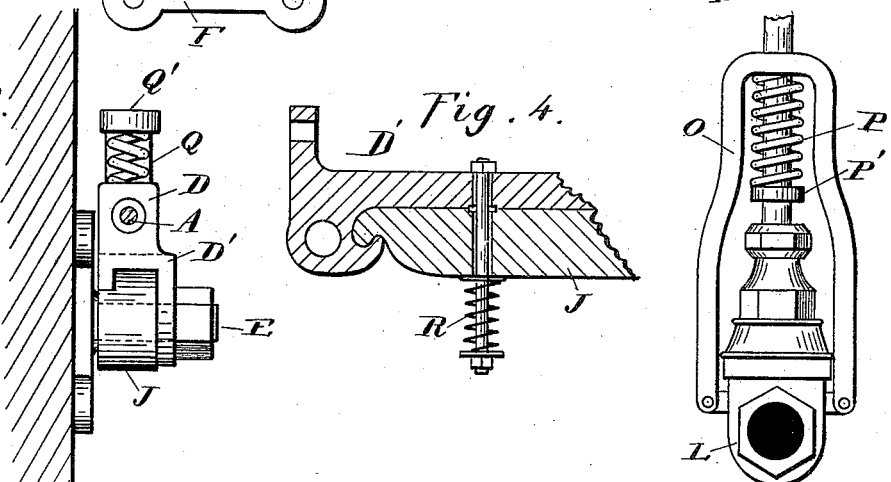
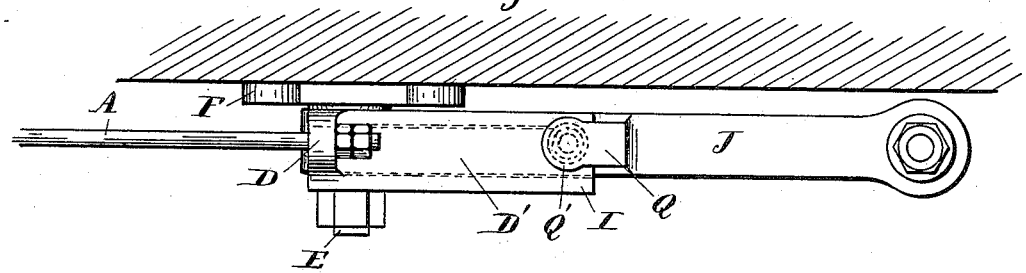
Witnesses:
Geo. A. Gregg.
P. M. Hulbert
Inventor:
James F McElroy,
By Thos. F. Maguire,
Atty.

UNITED STATES PATENT OFFICE.

JAMES F. McELROY, OF ALBANY, NEW YORK, ASSIGNOR TO THE CONSOLIDATED CAR HEATING COMPANY, OF SAME PLACE.

TEMPERATURE-REGULATOR.

SPECIFICATION forming part of Letters Patent No. 443,294, dated December 23, 1890.

Application filed May 5, 1890. Serial No. 350,588. (No model.)

*To all whom it may concern:*

Be it known that I, JAMES F. McELROY, a citizen of the United States, residing at Albany, in the county of Albany and State of New York, have invented certain new and useful Improvements in Temperature-Regulators, of which the following is a specification, reference being had therein to the accompanying drawings.

This invention relates to new and useful improvements in temperature-regulators especially designed to be applied to car-heating systems; and the invention consists in the peculiar arrangement of the levers for actuating a self-closing valve, in combination with an expansible rod for controlling the movement of said levers, and, further, in the construction, arrangement, and combination of the various parts, all as more fully hereinafter described.

In the drawings, Figure 1 is a side elevation of my improved device. Fig. 2 is an end elevation thereof, and Fig. 3 is a plan view. Fig. 4 shows a modified form of the levers.

A is an expansive rod—such as brass or zinc—of suitable length to give the necessary movement to the connecting levers by its expansion and contraction to close and open the steam-supply valve. In an ordinary car I propose to use a rod about forty feet long connected at one end into the bracket B, which is apertured to allow the rod to freely pass through, the rod being screw-threaded, and being adjusted by means of the nut C, bearing against the side of the bracket. The other end of this rod engages through an aperture in the arm D of the bell-crank lever D', which is pivoted upon the pivot-pin E upon the bracket F, stationarily secured upon the side of the car. This end of the rod has the adjusting-nut G, which has a convex face engaging in a concave recess in the arm of the lever, forming a ball-and-socket joint between.

H is a jam-nut to hold the nut G in position. The arm I of the bell-crank lever D' rests upon the valve-actuating lever J, and is recessed to embrace said lever, as plainly shown in Fig. 2. The lever J at its free end is apertured to receive the valve-stem K, which opens and closes the valve L. The stem K is screw-threaded and has the adjusting-nut M, having a convex face or washer engaging in a concave formed in the upper side of the lever, forming a ball-and-socket joint. A jam-nut N holds the adjusting-nut in its adjusted position.

O is a yoke secured to the valve L and provided with a suitable aperture, forming a guide for the stem K.

P is a spring bearing with its upper end against the yoke and with its lower end upon the lug P' upon the valve-stem.

Q is an upwardly-projecting arm upon the lever J, having a lateral projection Q', extending over the end of the arm I of the lever D'.

R is a spring between the arm I of the bell-crank lever and the extension of the lever J.

In putting up my device I engage, as before described, one end of the expansion rod in a stationary bracket and the other end in the aperture in the bell-crank lever D'. By screwing up the adjusting-nuts C and G the bell-crank lever D' is rocked upon its pivot sufficiently to put the spring R under compression. The compression of this spring is transmitted through the lateral arm Q' and standard Q to the lever J and from the lever through the valve-stem K to the spring P, compressing that spring and opening the valve L. When the temperature in a room or car has arrived at a point at which it is desired to be maintained, the expansion of the rod A will allow the bell-crank lever D' to be rocked, due to the tension of the spring P, the levers D' and J being held together by the spring R and being moved correspondingly upon the expansion of the rod. Should the temperature become excessively high, it is evident that the further movement of the rod A will simply rock the lever J downward, allowing it to slide over the valve-stem K without affecting the valve, which will be closed entirely only by the tension of the spring P. Should the car become excessively cold, contracting the rod A, it will simply rock the lever D' against the tension of the spring R. Thus it will be seen that no undue pressure is had upon the valve-seats due to the unusual expansion of the rod. Nor is there any danger of breaking the parts by the unusual contraction of the rod.

It will be seen that the expansible rod is under tension at all times, and its expansion simply allows the springs to act to close the valve, while its contraction simply acts against the springs.

Fig. 4 shows a modified form of the levers D' and J, showing the spring arranged below instead of above.

What I claim as my invention is—

1. In a temperature-regulator, the combination of a thermostat, a self-closing spring-valve, multiplying-levers arranged one directly above the other, elastically joined at their outer ends, and connected to the valve-stem to move the same only in the direction of opening the valve, and a thermostatic device connected to the short arm of one of said multiplying-levers to move it in that direction only, substantially as described.

2. In a temperature-regulator, the combination, with a thermostat and a self-closing spring-valve, of two levers, the short arm of one connected with the thermostat and the long arm of the other connected with the valve, and a yielding connection between the long arms of the levers, substantially as described.

3. In a temperature-regulator, the combination, with a thermostat-rod, of a bell-crank lever having its short arms connected with said rod, a fulcrum for the lever, a lever mounted on the fulcrum and extending out parallel with the long arm of the bell-crank and having a lateral arm thereon, a spring between the arm and long arm of the bell-crank, a valve, and a ball-and-socket connection between the same and lever, substantially as described.

4. In a temperature-regulator, the combination, with an expansible rod, of a bell-crank having a concaved depression in its short arm, a convexed washer on the rod seated in the concave, a supplemental lever below the bell-crank, a lateral arm having a projection extending over the bell crank, a spring interposed between the same and the end of the bell-crank, and a spring-actuated valve connected with the lower lever, substantially as described.

5. In a temperature-regulator, the combination, with a spring-actuated valve and a thermostat, of two parallel levers arranged one above the other and fulcrumed on a single fulcrum, an arm extending out from the lower lever and over the upper lever, and a spring interposed between the arm and the upper lever, substantially as described.

6. In a temperature-regulator, the combination, with the support, of a fulcrum-pin on the support, two parallel independent levers mounted on the fulcrum, a spring for normally holding the long arms of the levers together, a thermostat engaging one of the levers, and a self-closing valve connected with the other lever, substantially as described.

In testimony whereof I affix my signature, in presence of two witnesses, this 18th day of April, 1890.

JAMES F. McELROY.

Witnesses:
  EDWIN A. SMITH,
  JOHN B. BRAIDWOOD.